Nov. 8, 1949     L. M. BRIGHAM     2,487,217
TRACTOR FENDER
Filed Aug. 31, 1946
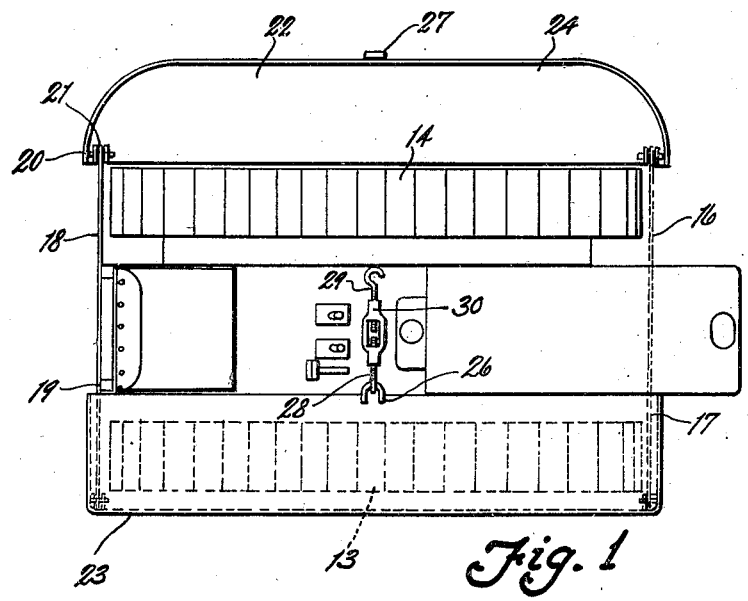
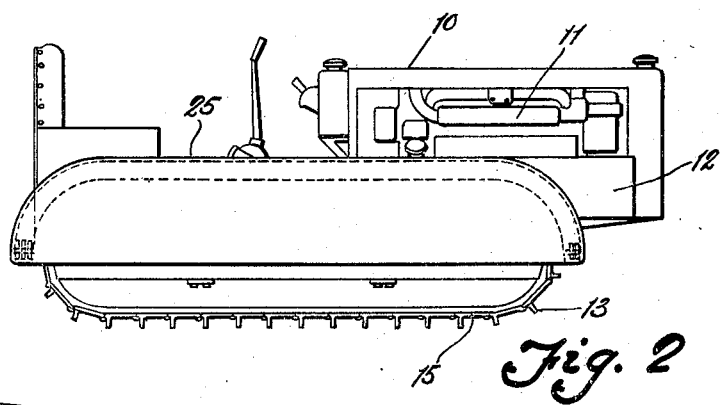
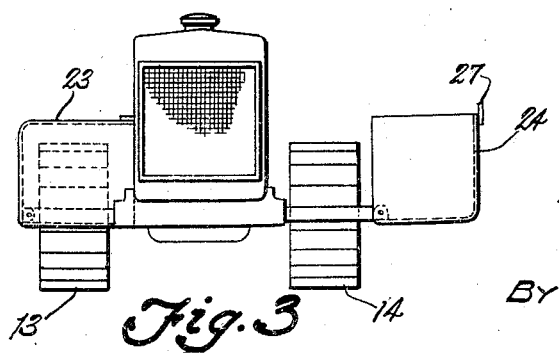
INVENTOR
Laurence M. Brigham
BY Lyon & Lyon
ATTORNEYS Patented Nov. 8, 1949

2,487,217

UNITED STATES PATENT OFFICE 2,487,217

TRACTOR FENDER

Laurence M. Brigham, Saticoy, Calif.

Application August 31, 1946, Serial No. 694,302

6 Claims. (Cl. 280—152)

1

This invention relates to tractor fenders and mounting therefor, and is particularly directed to an improved type of fender for use in connection with track laying tractors of the type commonly used in orchards, vineyards and other agricultural enterprises. The track laying tractor ordinarily has the disadvantage that the exposed mechanism for driving the tracks and the tracks themselves are open and exposed and often become entangled with small branches of trees or vines as the tractor moves along the ground. In the cultivation of orange-groves, for example, track laying tractors may snag small limbs which may damage the trees to greater or lesser extent and the fruit on that limb may be lost. Accordingly, it has become the practice to provide such tractors with fenders which are smooth in outline and free from projections and which enclose the major portion of the exposed endless track and the mechanism for turning it. These fenders as presently constructed, however, are bolted to the frame of the tractor and their removal is a time consuming operation. It is necessary that the fenders be periodically moved out of the way in order to inspect and lubricate the track laying mechanism.

It is therefore the principal object of my invention to provide a tractor fender having a novel form of mounting on a track laying tractor.

Another object is to provide a fender of this type which is pivotally mounted relative to the frame of the tractor for ease of access to the track laying mechanism.

Another object is to provide tractor fenders for a track laying tractor which are independently supported on the tractor frame by means of pivotal connections, and which are normally maintained in operative position by single releasable rotating elements extending transversely of the frame between the fenders.

Other objects and advantages will appear hereinafter.

In the drawings:

Figure 1 is a top plan view of a track laying tractor provided with fenders embodying my invention.

Figure 2 is a side elevation thereof.

Figure 3 is an end elevation, showing one of the fenders pivoted to its inoperative position to provide access to the endless track and driving mechanism of the tractor.

Referring to the drawings, the tractor unit generally designated 10 is provided with a prime mover 11 mounted on a frame 12 and positioned between the endless parallel driving tracks 13 and

2

14, each being formed of a series of individual grouser shoes 15. The frame 12 may be of any desired type and may comprise a separate unit upon which the various component parts of the tractor are supported, or it may comprise simply the transmission housing and associated parts. This feature is not material to my invention since my tractor fenders may be advantageously employed with either style of construction.

Attached to the frame 12 by any convenient means, such as by welding, are supporting brackets 16, 17, 18 and 19. The forward brackets 16 and 17 extend laterally from the tractor frame at a position in advance of the endless tracks 13 and 14. Similarly, the rear brackets 18 and 19 extend laterally from the tractor frame at a position to the rear of the endless tracks 13 and 14. The outer projecting end of each of these brackets carries a pivot pin 20 which is received by a pair of spaced lugs 21. The lugs 21 are carried on the lower edge and at opposite ends of a depending skirt 22 on each of the fenders 23 and 24. The skirt 22 on each of the fenders is joined to a cover 25, which overlies the endless track and may be curved at its opposed ends to conform generally to the curvature of the track. Lugs 26 and 27 fixed to the cover portions of the fenders 23 and 24 respectively are secured to right hand and left hand hooks 28 and 29 which are threaded into a turnbuckle 30. The hooks 28 and 29 and turnbuckle 30 extend transversely across the frame 12. When it is desired to inspect, lubricate or gain access to the track elements 13 and 14 the turnbuckle 30 is disconnected, simultaneously disconnecting both of the fenders 23 and 24. Each fender may then be pivoted away from the tractor frame about the pivot pin 20 to expose the endless track and its associated mechanism. It will be apparent that this method of mounting a tractor fender enables an operator to gain access to the endless track devices in a minimum time.

In conventional fenders now employed the method of attachment to the tractor includes a plurality of bolts which are relatively inaccessible and it is not unusual that one-half day should be required to remove and replace the fenders. For this reason the side skirts on the fenders are of minimum depth and do not adequately enclose the operating mechanism for the endless tracks against entrance of branches of trees or vines. The fenders are mounted in this way in order that moving parts of the endless tracks and associated mechanism may be lubricated without the necessity of removing the fenders in order to gain access to the parts. By my construction I not only enable an operator to expose the endless track and its mechanism in a minimum of time, but I am also able to provide a smooth skirt depending sufficiently below the top level of the fender to insure that branches of trees or vines will not become entangled in the mechanism of the tractor.

Having fully described my invention, it is to be understood that I do not wish to be limited to the details herein set forth, but my invention is of the full scope of the appended claims.

I claim:

1. In combination with a tractor having a frame and endless track laying elements on opposite sides of the frame, a fender for each of said track laying elements, each fender including a cover portion adapted to overlie one of said elements and a skirt portion depending therefrom, means at the opposite ends of each fender for pivotally supporting the fender on the frame, said pivotal means being located adjacent the lower edge of the depending skirt, the axes of the pivotal means being substantially horizontal and extending longitudinally of the tractor whereby the fenders each may be pivoted outwardly laterally away from the frame as a unit to expose the entire length of the upper flight of said endless track laying elements, and releasable securing means extending transversely of the frame normally adapted to maintain both fenders in operative position.

2. In combination with a tractor having a frame and endless track laying elements on opposite sides of the frame, a pair of fenders adapted to enclose a portion of each of said endless track laying elements, each of said fenders including a cover portion adapted to engage the tractor frame and to overlie one of said elements, a skirt portion depending from each cover portion, pivotal means adjacent the opposite ends of each depending skirt and located near the lower edge thereof for supporting the fenders upon the frame, the axes of the pivotal means being substantially horizontal and extending longitudinally of the tractor, and securing means extending transversely of the frame normally adapted to maintain both fenders in operative position, said securing means being selectively releasable to enable both fenders to be pivoted laterally away from the frame to expose the entire length of the upper portion of the track laying elements.

3. In combination with a tractor having a frame and endless track laying elements on opposite sides of the frame, a pair of fenders adapted to enclose a portion of each of said endless laying elements, each of said fenders including a cover portion adapted to overlie one of said elements, a skirt portion depending from the cover portion, pivotal means adjacent the opposite ends of each depending skirt and located near the lower edge thereof for supporting the fenders upon the frame, the axes of the pivotal means being substantially horizontal and extending longitudinally of the tractor, and a turnbuckle extending transversely of the frame adapted for connection with both of said cover portions to maintain both fenders in operative position on the frame, said means being releasable to enable both fenders to be pivoted laterally away from the frame to expose the entire upper portion of the track laying elements.

4. In combination with a tractor having a frame and endless track laying elements on opposite sides of the frame, a fender for each of said track laying elements, each fender including a cover portion adapted to overlie one of said elements and a skirt portion depending therefrom, stationary brackets secured to the frame and extending laterally therefrom at locations fore and aft of the track laying elements, pivotal means at the opposite ends of each fender for pivotally supporting the fender on said stationary brackets, said pivotal means being located adjacent the lower edge of the depending skirt, the axes of the pivotal means being substantially horizontal and extending longitudinally of the tractor whereby the fenders each may be pivoted outwardly laterally away from the frame as a unit to expose the entire upper portion of said endless track laying elements, and releasable means extending transversely of the frame normally adapted to maintain both fenders in operative position.

5. In combination with a tractor having a frame and endless track laying elements on opposite sides of the frame, a fender for each of said track laying elements, each fender including a cover portion adapted to overlie one of said elements and a skirt portion depending therefrom, stationary brackets secured to the frame and extending laterally therefrom at locations fore and aft of the track laying elements, pivotal means at the opposite ends of each fender for pivotally supporting the fender on said stationary brackets, said pivotal means being located adjacent the lower edge of the depending skirt, the axes of the pivotal means being substantially horizontal and extending longitudinally of the tractor whereby the fenders may be pivoted outwardly laterally away from the frame to provide access to said endless track laying elements, and releasable means normally adapted to maintain the fenders in operative position.

6. In combination with a tractor having a frame and endless track laying elements on opposite sides of the frame, a pair of fenders adapted to enclose a portion of each of said endless track laying elements, each of said fenders including a cover portion adapted to overlie one of said elements and a skirt portion depending from the cover portion, stationary brackets secured to the frame and extending laterally therefrom at locations fore and aft of the track laying elements, pivot means at the opposite ends of each fender for pivotally supporting the fender on said stationary brackets, the axes of the pivot means being substantially horizontal and extending longitudinally of the tractor, means including a turnbuckle extending transversely of the frame for connection with both of said cover portions to maintain both fenders in operative position on the frame, said means being releasable to enable both fenders to be pivoted laterally away from the frame to expose the track laying elements.

LAURENCE M. BRIGHAM.

REFERENCES CITED

The following references are of record in the file of this patent:

UNITED STATES PATENTS

| Number | Name | Date |
| --- | --- | --- |
| 2,086,172 | Northup | July 6, 1937 |
| 2,211,654 | Heaslet | Aug. 13, 1940 |
| 2,447,898 | Colaner, Sr. | Aug. 24, 1948 |